United States Patent [19]

Akita

[11] 4,405,896
[45] Sep. 20, 1983

[54] TRANSFORMER COUPLED POSITION DETECTING APPARATUS WITH PHASE CHANGE DETECTOR

[75] Inventor: Sigeyuki Akita, Okazaki, Japan

[73] Assignee: Nippon Soken, Inc., Nishio, Japan

[21] Appl. No.: 319,679

[22] Filed: Nov. 9, 1981

Related U.S. Application Data

[63] Continuation of Ser. No. 86,034, Oct. 18, 1979, abandoned.

[30] Foreign Application Priority Data

Nov. 23, 1978 [JP] Japan ............................ 53-145031

[51] Int. Cl.³ .................. G01B 7/00; G01P 3/48; G01R 25/00
[52] U.S. Cl. .................. 324/208; 324/83 D; 324/173
[58] Field of Search ............ 324/83 R, 83 D, 166, 324/173, 174, 208, 239, 241–243

[56] References Cited

U.S. PATENT DOCUMENTS

| | | | |
|---|---|---|---|
| 3,002,384 | 10/1961 | MacDonald et al. | 324/173 X |
| 3,209,292 | 9/1965 | Montross | 324/243 X |
| 3,273,056 | 9/1966 | Flaherty et al. | 324/241 |
| 3,371,272 | 2/1968 | Stanton | 324/243 |
| 3,505,595 | 4/1970 | Favre | 324/160 |
| 3,614,615 | 10/1971 | Cass | 324/166 X |
| 3,855,525 | 12/1974 | Bernin | 324/173 X |
| 4,001,687 | 1/1977 | Sorkin et al. | 324/173 |
| 4,013,945 | 3/1977 | Grosso | 324/173 X |
| 4,112,365 | 9/1978 | Larson et al. | 324/83 D |
| 4,121,112 | 10/1978 | Hartig | 324/173 X |
| 4,128,812 | 12/1978 | Pavlis | 324/83 D X |
| 4,147,574 | 4/1979 | La Pointe et al. | 324/243 X |
| 4,164,706 | 8/1979 | Akita et al. | 324/208 |
| 4,259,637 | 3/1981 | Bloomfield et al. | 324/173 X |

FOREIGN PATENT DOCUMENTS 834783 5/1960 United Kingdom ............... 324/208

*Primary Examiner*—Gerard R. Strecker
*Attorney, Agent, or Firm*—Cushman, Darby & Cushman

[57] ABSTRACT

A rotation detecting apparatus includes a transformer consisting of a primary coil disposed to be energized by an energizing source and two secondary coils connected in opposite polarity to each other on the longitudinal sides of the primary coil. The magnetic coupling of the transformer is changed in response to the rotation of a rotating body and this changes the phase of the composite voltage signal of the secondary coils. By virtue of this construction, not only the rotation of the rotating body can be detected at low rotational speeds, but also the rotation can be detected accurately without being affected by the ambient temperature.

3 Claims, 12 Drawing Figures

TRANSFORMER COUPLED POSITION DETECTING APPARATUS WITH PHASE CHANGE DETECTOR

This is a continuation of application Ser. No. 86,034 filed Oct. 18, 1979, and now abandoned.

BACKGROUND OF THE INVENTION

The present invention relates to a rotation detecting apparatus for detecting the rotation of the engine crankshaft or the like of an automobile, for example.

In the past, an apparatus for detecting the rotation of the engine crankshaft or the like of an automobile, for example, has been proposed in which a magnetic body having a coil wound thereon is arranged opposite to a rotating body and an alternating electromotive force is induced by changes in the magnetic flux caused by the projections and depressions on the rotating body to detect the rotation of the rotating body.

However, this type of apparatus is disadvantageous in that since the alternating electromotive force induced in the coil is influenced by the flux changes causing the electromotive force or the rotational speed of the rotating body, when the rotational speed of the rotating body is low, practically no alternating electromotive force will be induced and the detection of the rotation of the rotating body will become impossible.

To overcome the foregoing deficiency in the prior art, apparatus are known in the art comprising, as disclosed in U.S. Pat. No. 3,147,574 or U.S. Pat. No. 3,371,272, a differential transformer consisting of a primary coil disposed to be energized by an energizing source and two secondary coils, whereby the magnetic coupling of the transformer is changed in response to the revolution of a rotating body and the rotation is detected depending on whether the output voltage value of the differential transformer is greater than a predetermined value. A disadvantage of this type of apparatus is that the output voltage value of the differential transformer varies under the effect of the ambient temperature, thus making it impossible to detect the rotation of the rotating body accurately.

SUMMARY OF THE INVENTION

With a view to overcoming the foregoing deficiencies, it is the object of the invention to provide a rotation detecting apparatus comprising a transformer consisting of a primary coil disposed to be energized by an energizing source and two secondary coils connected in opposite polarity to each on the longitudinal sides of the primary coil whereby the magnetic coupling of the transformer is changed in response to the rotation of a rotating body and the resulting change in the phase of the composite voltage signal of the secondary coils is detected to generate a rotational position signal and thereby to ensure the detection of the rotation even at low rotational speeds of the rotating body as well as the accurate detection of the rotation without being affected by the ambient temperature.

These and other objects, features and advantages of this invention will be apparent from the following description taken in conjunction with the accompanying drawings.

DESCRIPTION OF THE PREFERRED EMBODIMENTS

The invention will now be described in greater detail with reference to the illustrated embodiments.

Figure 1:
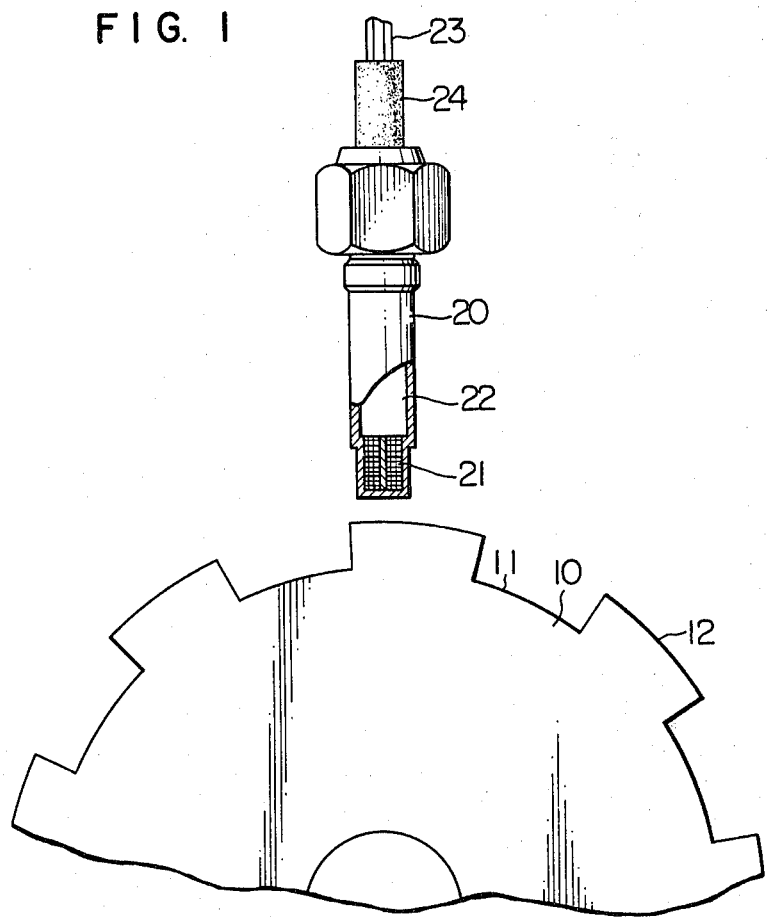
FIG. 1 is a partly cutaway front view showing the overall construction of an embodiment of an apparatus according to the invention.
Figure 2:
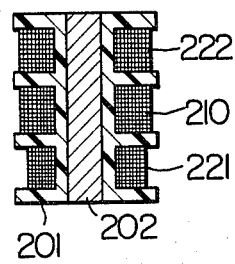
FIG. 2 is a longitudinal sectional view showing the transformer used in the apparatus shown in FIG. 1.

Referring first to FIG. 1 showing the overall construction of an embodiment of the invention, numeral 10 designates a conductive rotating body mounted on a shaft rotatable in synchronism with the rotation of the crankshaft of an engine, for example, and the rotating body 10 is formed with projections 11 and depressions 12 on the outer peripheral surface thereof. Numeral 20 designates an exterior portion of a sensor comprising a wire-wound transformer 21, an electric circuit section 22 including an oscillator circuit and a detecting circuit for detecting the voltage signal output of the transformer 21, lead wires 23 brought out from the electric circuit section 22 and a rubber cap 24 for protecting the lead wires 23. As shown in FIG. 2, the transformer 12 comprises a primary coil 210 and two secondary coils 221 and 222 which are arranged on the longitudinal sides of the primary coil 210, and the secondary coils 221 and 223 which are different in number of turns are connected in opposite polarity to each other so that their directions of winding are opposite to each other. Numeral 201 designates a coil bobbin on which are wound the coils 210, 221 and 222, and 202 an iron core made of ferrite or the like which is placed in the central portion of the coil bobbin 201.

Figure 3:
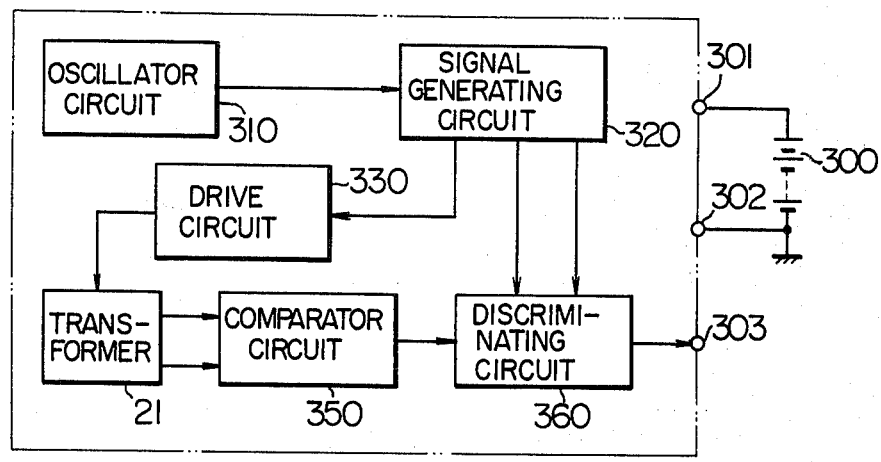
FIG. 3 is a block diagram showing an electric construction of the apparatus of FIG. 1.

FIG. 3 shows a block diagram for the electrical circuitry of the apparatus shown in FIG. 1. In the Figure, numeral 300 designates a power source such as a storage battery, 301 a supply terminal, 302 a ground terminal, and 303 a signal output terminal. Numeral 310 designates an oscillator circuit which oscillates at a fixed frequency, 320 a signal generating circuit responsive to the pulse signals from the oscillator circuit 310 to generate a drive signal for energizing the transformer primary coil and detection signals for detecting the output voltage state of the transformer secondary coils, 330 a drive circuit responsive to the drive signal for energizing the primary coil 210 of the transformer 21, 350 a comparator circuit for comparing and amplifying the composite output voltage signal of the secondary coils 221 and 222 of the transformer 21, and 360 a discrimination circuit responsive to the detection signals from the signal generating circuit 320 to discriminate the state of the composite output voltage signal of the secondary coils 221 and 222.

Figure 4:
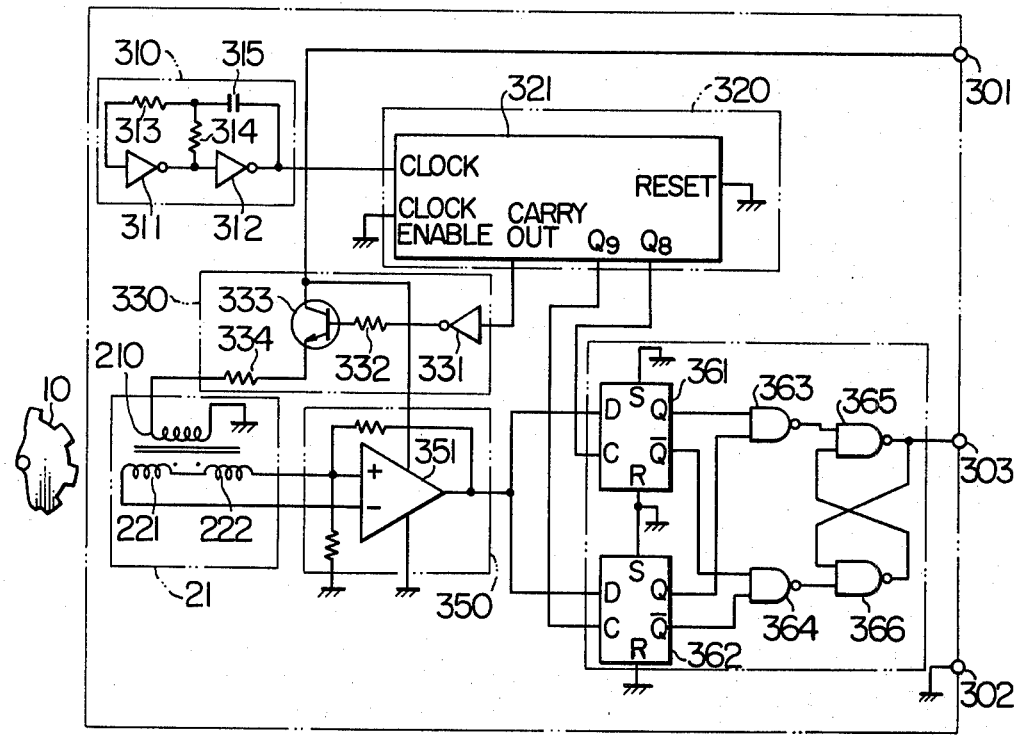
FIG. 4 is a circuit diagram showing in detail the principal parts of FIG. 3.
Figure 5:
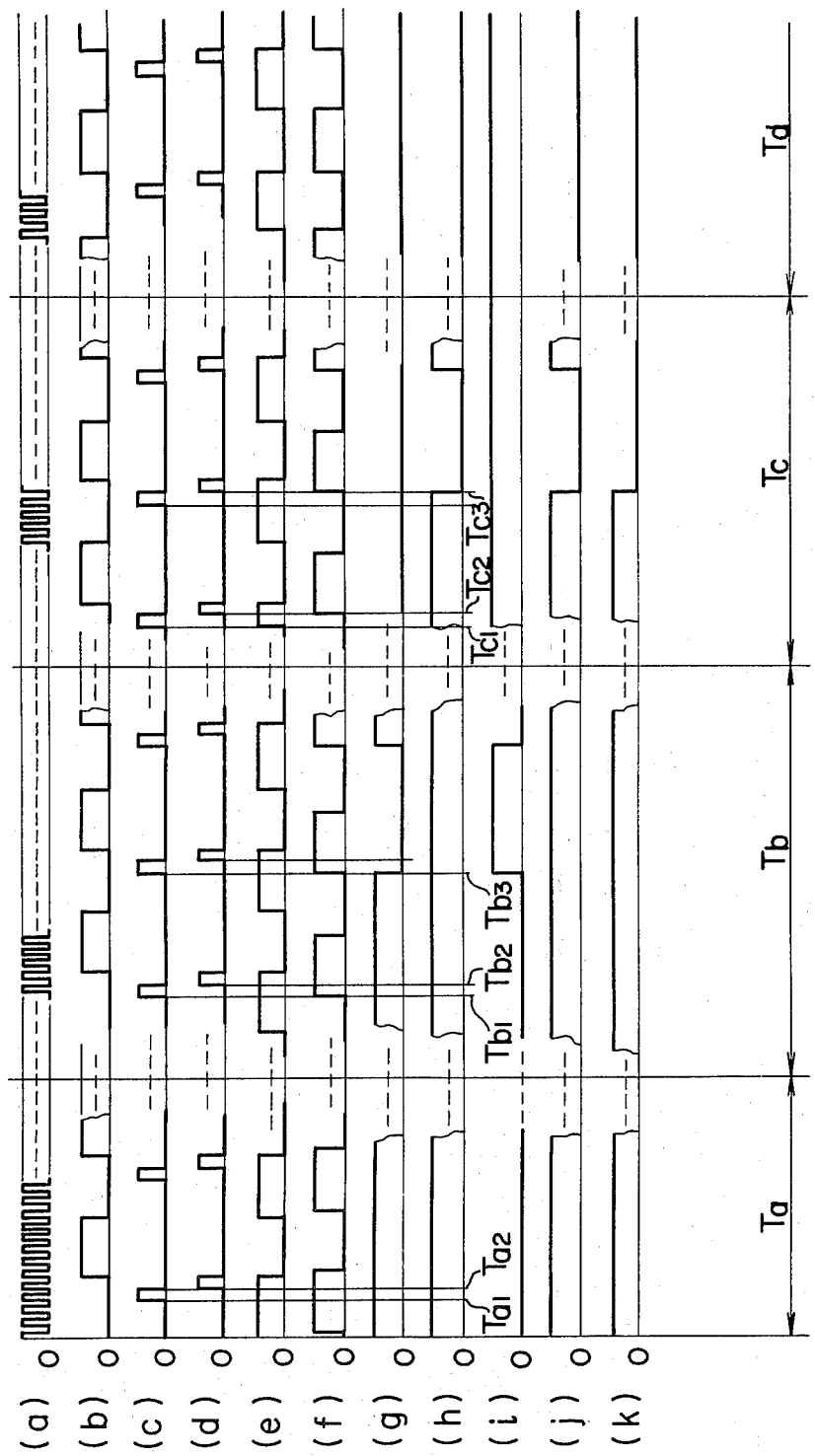
FIG. 5 is a waveform diagram useful for explaining the operation of the circuits shown in FIG. 4.
Figure 6A:
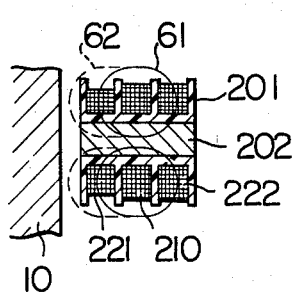
FIGS. 6A and 6B are respectively a longitudinal sectional view and a circuit diagram useful for explaining the operation of the transformer used in the apparatus of FIG. 1.
Figure 6B:
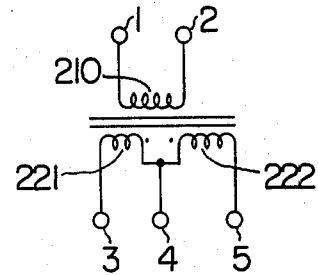
Figure 7:
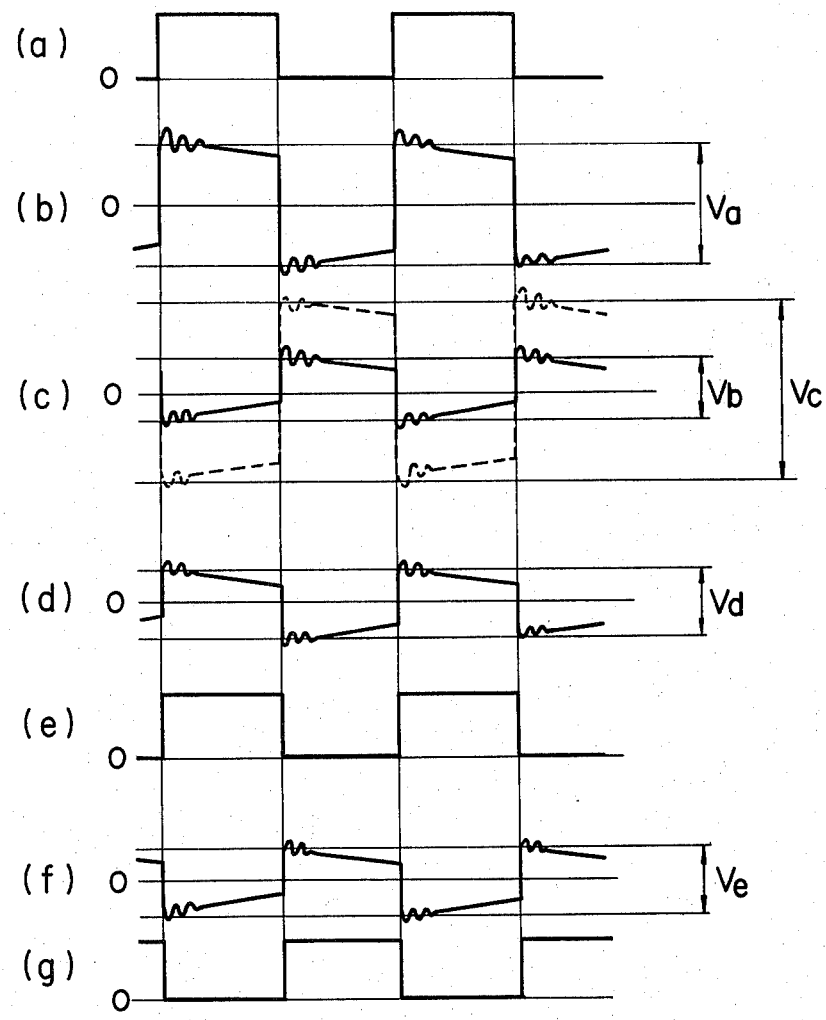
FIG. 7 is a waveform diagram useful for explaining the operation of the transformer shown in FIGS. 6A and 6B.
Figure 9:
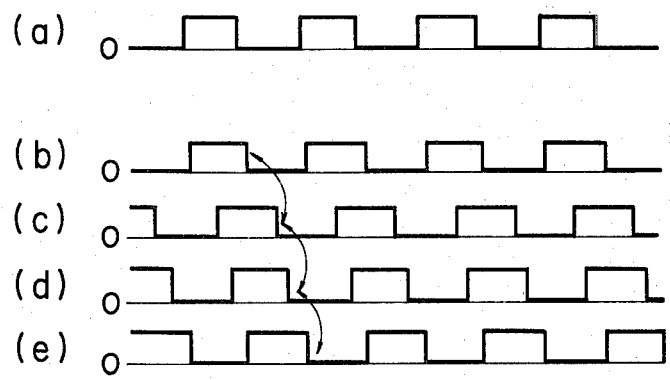
FIG. 9 is a diagram showing the variations of the output corresponding to the operating conditions of the transformer shown in FIG. 8.
Figure 8:
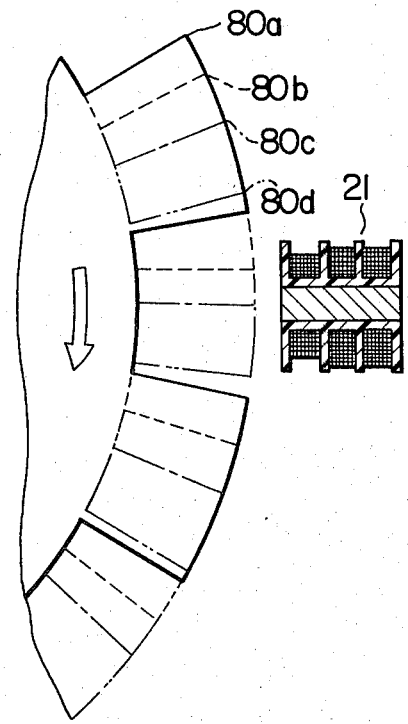
FIG. 8 is a partially sectional front view useful in explaining the operation of the transformer shown in FIGS. 6A and 6B.

With the construction described above, the operation of the embodiment will now be described with reference to the detailed circuit diagram of FIG. 4. In the Figure, the oscillator circuit 310 comprises inverter gates 311 and 312, resistors 313 and 314 and a capacitor 315, whereby pulse signals of a fixed frequency are generated at the output of the inverter gate 312 as shown in (a) of FIG. 5. The signals are applied to the clock terminal CLOCK of a counter 321 forming the signal generating circuit 320, so that pulse signals are generated at its carry-out terminal each of which goes respectively to "1" and "0" in response to every five input pulse signals as shown in (b) of FIG. 5 and another pulse signals are respectively generated at a fixed period at its outputs $Q_8$ and $Q_9$ as shown in (c) and (d) of FIG. 5. The operation of the counter 321 can be met by the RCA COS/MOS IC CD4017. The carry-out signal from the counter 321 is applied to an inverter gate 331 of the drive circuit 330, so that the resulting inverter output signal turns on a transistor 333 through a resistor 332 and the drive signal shown in (e) of FIG. 5 is supplied to the primary coil 210 through a resistor 334. The voltage signals which will be generated between the terminals of the secondary coils 221 and 222, respectively, in response to the application of the drive signal to the primary coil 210, will be explained with reference to FIGS. 6A and 6B. FIG. 6A shows the configuration of the transformer 21 and FIG. 6B shows the connections of its coils. The transformer 21 operates differently depending on whether the rotating body 10 is made of a ferromagnetic material such as iron (hereinafter referred to as magnetic material) or the rotating body 10 is made of a paramagnetic material such as aluminum or a diamagnetic material such as copper (these materials will be hereinafter referred to as nonmagnetic materials), and the operation of the transformer 21 will be described first with reference to the case where the rotating body 10 is made of a magnetic material. In this case, the number of turns in the secondary coil 221 on the side of the rotating body 10 is smaller than that in the other secondary coil 222. As a result, with the rotating body 10 being remote from the transformer 21, when the drive signal shown in (a) of FIG. 7 is applied across the terminals 1 and 2 of the primary coil 210, a voltage signal which is in phase with the drive signal applied to the primary coil 210 is generated as shown in (b) of FIG. 7 across the terminals 4 and 5 of the secondary coil 222 shown in FIG. 6B. This voltage is designated by $V_a$. Simultaneously, a voltage signal is generated across the terminals 3 and 4 of the secondary coil 221 which is opposite in phase and lower in value than the voltage signal $V_a$ as shown by the solid line in (c) of FIG. 7. This voltage is designated by $V_b$. As a result, a voltage signal $V_d(V_d=V_a-V_b)$ which is in phase with the drive signal is generated across the terminals 3 and 5 of the series-connected secondary coils 221 and 222 as shown in (d) of FIG. 7 and the voltage signal $V_d$ is applied across the two comparison inputs of the comparator circuit 350 which in turn generates the amplified signal shown in (e) of FIG. 7. When the magnetic body comes near the transformer 21, as shown in FIG. 6A, the magnetic lines of force 61 generated when the magnetic body was remote is now changed as indicated by numeral 62 as the magnetic body approaches the transformer 21 and this increases the magnetic coupling between the primary and secondary coils 210 and 221. As a result, a voltage signal of a voltage $V_c(V_c>V_a)$ is generated across the terminals 3 and 4 of the secondary coil 221 as shown by the broken line in (c) of FIG. 7. Consequently, a signal of a voltage $V_e(V_e=V_c-V_a)$ which is opposite in phase to the drive signal as shown in (f) of FIG. 7, is generated across the terminals 3 and 5 of the series-connected secondary coils 221 and 222 and the signal is compared and amplified by the comparator circuit 350 which in turn generates the signal shown in (g) of FIG. 7. It will thus be seen that by detecting the phase relation between the drive signal and the voltage signal appearing across the terminals 3 and 5 of the series-connected secondary coils 221 and 222, it is possible to detect whether the magnetic body is remote or near the transformer 21. In fact, however, due to the magnetic leakage of the coils, the difference in transmission time between the coils, the magnetic hysteresis of the iron core, the voltage signal appearing across the terminals of the series-connected secondary coils 221 and 222 will not abruptly change its phase at any definite distance from the transformer 21 in response to the movement of the magnetic body away from or toward the transformer 21. Thus, assuming that the rotating body 10 consisting of a magnetic member which is formed with projections and depressions opposite the transformer 21 is rotated in the direction of the arrow as shown in FIG. 8 so that the projection end is successively moved by the rotation as shown by a solid line 80a, a broken line 80b, a one-dot line 80c and a two-dot line 80d, the output resulting from the comparison and amplification of the composite output voltage signal of the secondary coils 221 and 222 will successively change in phase as shown in (b), (c), (d) and (e) of FIG. 9 relative to the drive signal shown in (a) of FIG. 9. These changes are shown in terms of changes with time in (f) of FIG. 5 and the comparator output is generated at the output terminal of an operational amplifier 351 of the comparator circuit 350. In other words, the time intervals $T_a$, $T_b$, $T_c$ and $T_d$ in FIG. 5 respectively correspond to the projection ends 80a, 80b, 80c and 80d in FIG. 8.

The operation of the embodiment will be first described with reference to the interval $T_a$ of FIG. 5 in which the projection end of FIG. 8 is at 80a or the transformer 21 is opposite to the depression 11 of the rotating body 10. Since, as mentioned previously, the voltage generated in the secondary coil 222 is higher than that of the secondary coil 221 when the magnetic body is remote, a composite voltage signal which is in phase with the signal of the secondary coil 222 is generated across the terminals 3 and 5 of the secondary coils 221 and 222 and the signal is compared and amplified by the operational amplifier 351 which in turn generates at its output the phase signal shown in (f) in the interval $T_a$ in (f) of FIG. 5. This phase signal is applied to the data terminal of first and second D-type flip-flops 361 and 362, respectively, of the discrimination circuit 360. On the other hand, the previously mentioned signal from the output terminal $Q_8$ of the counter 321 or the signal shown in (c) of FIG. 5 (hereinafter referred to as a first detection signal) is applied to the clock terminal of the first D-type flip-flop 361 and the previously mentioned signal from the output terminal $Q_9$ of the counter 321 or the signal shown in (d) of FIG. 5 (hereinafter referred to as a second detection signal) is applied to the clock terminal of the second D-type flip-flop 362. At the time of the positive-going transition of the first detection signal (at $T_{a1}$ in FIG. 5) and the positive-going transition of the second detection signal (at $T_{a2}$ in FIG. 5), respectively, the signal applied to the data terminal of the first and second D-type flip-flops 361 and 362, respectively, is a "1" signal as shown in (f) of FIG. 5 so that a "1" signal is generated at the output Q of the respective flip-flops as shown in (g) and (h) of FIG. 5 and a "0" signal is generated at the outputs $\overline{Q}$. As a result, a "0" signal is generated at the output of a NAND gate 363 as shown in (i) of FIG. 5 and a "1" signal is generated at the output of a NAND gate 364 as shown in (j) of FIG. 5. These output signals are applied to the inputs of an R-S flip-flop comprising NAND gates 365 and 366 and consequently a "1" signal is generated at the signal output terminal 303 as shown in (k) of FIG. 5.

On the other hand, when the rotating body 10 made of a magnetic material is rotated so that the projection end 80a shown in FIG. 8 is moved to 80b, the output signal of the operational amplifier 351 is shifted in phase as mentioned previously. Assuming now that the positive-transition of the output signal of the operational amplifier 351 coincides with that of the first detection signal as shown in the interval $T_b$ of FIG. 5 when the projection end of the rotating body 10 is at 80b, the pulse signal shown in the interval $T_b$ in (g) of FIG. 5 is generated at the output Q of the first D-type flip-flop 361 which goes to "1" at a time $T_{b1}$ in FIG. 5 but goes to "0" at another time $T_{b3}$. This signal from the output Q of the first D-type flip-flop 361 and its inverted signal from the output $\overline{Q}$ of the first D-type flip-flop 361 are respectively applied to the NAND gates 363 and 364. On the other hand, since the output signal of the operational amplifier 351 is always held at "1" at the time of the positive-going transition of the second detection signal, the signals at the outputs Q and $\overline{Q}$ of the second D-type flip-flop 362 are the same as was the previously mentioned case when the projection end of the rotating body 10 was at the position of 80a in FIG. 8, that is, a "1" signal is generated at the output Q and a "0" signal is generated at the output $\overline{Q}$. The "0" signal from the output $\overline{Q}$ closes the NAND gate 364 and consequently the output signal of the NAND gate 364 remains at "1". Thus, the state of the R-S flip-flops remains the same as was the case when the projection end of the rotating body 10 was at the position of 80a in FIG. 8 and the signal at the signal output terminal 303 is held at "1".

Also assume that when the rotating body 10 made of a magnetic material is rotated further so that the projection end shown in FIG. 8 is moved to 80c, as shown in the interval $T_c$ of FIG. 5 the positive-transition of the output signal of the operational amplifier 351 coincides with that of the previously mentioned second detection signal. In this case, the output signal of the operational amplifier 351 is always at "0" at the time of the positive-going transition of the first detection signal. As a result, a "0" signal and a "1" signal are respectively generated at the outputs Q and $\overline{Q}$ of the first D-type flip-flop 361 and these signals respectively cause the NAND gate 363 to close and the NAND gate 364 to open. On the other hand, since the positive-going transition of the second detection signal is in coincidence with that of the output signal of the operational amplifier 351, in the like manner as the previously mentioned operation of the first D-type flip-flop 361 during the interval $T_b$ of FIG. 5, during the interval $T_c$ a pulse signal is generated at the output Q of the second D-type flip-flop 362 which goes to "1" and "0", respectively, as shown in the interval $T_c$ in (h) of FIG. 5. Consequently, the signal shown in (j) of FIG. 5 is generated at the output of the NAND gate 364 which goes to "0" when the signal at the output Q of the second D-type flip-flop 362 goes to "1" or at the time $T_{c3}$ in FIG. 5. As a result, the state of the R-S flip-flop is changed and a "0" signal is generated at the output of the NAND gate 365 or the signal output terminal 303. It will be seen that unless the output state of the first D-type flip-flop 361 changes, the signal at the signal output terminal 303 will thereafter remain at "0" even if the output of the second D-type flip-flop 362 is changed. Thus, when the rotating body 10 made of a magnetic material is rotated so that its projection end is moved from the position of 80c to the position of 80d in FIG. 8 or when the magnetic body comes nearest to the transformer 21, the signal at the signal output terminal 303 is at "0".

While the above-described operation represented the case where the magnetic body was moved toward the transformer 21, when the magnetic body is moved away from the transformer 21 so that the signals of FIG. 5 change as shown in the intervals $T_d$, $T_c$, $T_b$ and $T_a$ in this order, in the like manner as the previously mentioned operation a "0" signal is generated at the signal output terminal 303 during the intervals $T_d$ and $T_c$, during the interval $T_b$ the signal at the signal output terminal 303 goes to "1" in response to the positive-going transition of the signal at the output Q of the first flip-flop 361 and the signal remains at "1" during the interval $T_a$.

It will thus be seen that the signals corresponding to the projections and depressions of the rotating body 10 made of a magnetic material are generated, that is, a "1" signal is generated at the signal output terminal 303 when the depression 11 is brought opposite to the transformer 21 and a "0" signal is generated at the signal output terminal 303 when the projection 12 is brought opposite to the transformer 21.

Figure 10A:
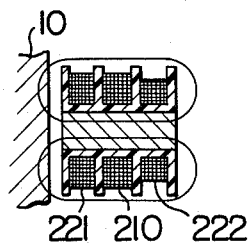
FIGS. 10A and 10B are respectively a longitudinal sectional view and a circuit diagram showing another embodiment of the transformer used in the apparatus of FIG. 1.
Figure 10B:
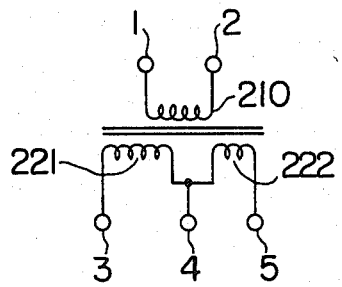

In the case of the rotating body made of a nonmagnetic material, the operation of the embodiment is as follows. Referring to FIG. 6A, when the nonmagnetic body constituting the rotating body 10 comes near the secondary coil 221, the resulting eddy current loss in the nonmagnetic body decreases the magnetic coupling between the primary coil 210 and the secondary coil 221 and the voltage generated across the terminals 3 and 4 of the secondary coil 221 is decreased over that produced when the nonmagnetic body is remote. As a result, contrary to the previously mentioned case where the rotating body 10 was made of a magnetic material, if the number of turns in the secondary coil 221 on the side of the rotating body 10 is increased over that in the other secondary coil 222 as shown in FIGS. 10A and 10B, by virtue of the same operation as was the case with the rotating body 10 made of a magnetic material, a signal of the opposite phase will be generated across the secondary coil terminals 3 and 5. In other words, the movement of the nonmagnetic body toward the transformer 21 results in the generation of a voltage signal across the secondary coil terminals 3 and 5 which is in phase with the drive signal applied to the primary coil 210, whereas the movement of the nonmagnetic body away from the transformer 21 results in the generation of a signal across the secondary coil terminals 3 and 5 which is opposite in phase to the drive signal applied to the primary coil 210. The operation of detecting the phase of a signal generated across the secondary coil terminals 3 and 5 is all the same as in the previously mentioned case of the magnetic body, that is, in FIG. 8, when the projection end of the rotating body 10 made of a nonmagnetic material is moved in the order 80$a$-80$b$-80$c$-80$d$ relative to the transformer 21 having the coils wound for use with the nonmagnetic body (FIG. 8 shows the coils for magnetic body), the previously mentioned operation of FIG. 4 changes to the order $T_d$-$T_c$-$T_b$-$T_a$ in FIG. 5. In other words, when the depressed portion of the rotating body 10 is opposite to the transformer 21, the signal at the signal output terminal 303 of FIG. 4 goes to "0", whereas when the projected portion is opposite to the transformer 21 the signal at the signal output terminal 303 goes to "1". In order that the same signals as in the case of the magnetic body may be produced in the case of the nonmagnetic body, that is, in order that a "1" signal may be generated at the signal output terminal 303 when the depressed portion is opposite to the transformer 21 and a "0" signal may be generated when the projected portion is opposite to the transformer 21, it is only necessary to reverse the direction of winding or the direction of connection of the secondary coils 221 and 222.

When the nonmagnetic body is moved toward the transformer 21, the magnetic coupling between the primary coil 210 and the secondary coil 221 is increased, whereas when the nonmagnetic body is moved toward the transformer 21 the magnetic coupling between the primary coil 210 and the secondary coil 221 is decreased. Thus, it will be seen that by making the number of turns in the secondary coil 221 equal to that in the secondary coil 222 (no voltage signal will be generated across the secondary coil terminals when there is no conductor) and by replacing the rotating body 10 having the depressed and projected portion with a rotating body formed with magnetic and nonmagnetic portions arranged alternately in the same plane to be opposite to the transformer 21, it is possible to generate a "1" or "0" signal at the signal output terminal by the rotation of the rotating body.

While, in the embodiment described above, a pulse signal is applied as a primary coil drive signal, any other signal such as a sinusoidal wave or triangular wave signal may be applied.

Further, in the above-described embodiment, the drive signal and the detection signals are generated from the counter 321, the invention is not intended to be limited thereto. Still further, while, in the embodiment, the secondary coils 221 and 222 are connected in series, the secondary coils 221 and 222 may be connected in parallel with each other.

It will thus be seen from the foregoing that in accordance with the invention, by virtue of the fact that there is provided a transformer consisting of a primary coil adapted to be energized an energizing source and a pair of secondary coils connected in opposite polarity to each other and arranged on the longitudinal sides of the primary coil, that the magnetic coupling of the transformer is varied in response to the rotation of a rotating body to change the phase of the composite voltage signal of the secondary coils, that the ends of the interconnected secondary coils are respectively connected to the two comparison inputs of a comparator circuit to generate a rectangular wave output in accordance with the composite voltage signal of the secondary coils and that a change in the phase of the rectangular wave output caused by the rotation of the rotating body is detected to generate a rotational position signal, the rotational speed can be detected in response to the changes in the phase of the composite voltage signal of the secondary coils irrespective of the magnitude of the rotational speed thus ensuring the detection of rotation even at low rotational speeds and moreover due to the fact that the composite voltage signal of the secondary coils is applied to the two comparison inputs of the comparator circuit so as to generate a rectangular wave output and to detect a change in the phase of the rectangular wave output, the rectangular wave output of the comparator circuit is not changed by a change in the ambient temperature and thus the accurate detection of rotation can be accomplished without being influenced by the ambient temperature.

Another great advantage of the invention is the fact that in accordance with the described embodiment, the phase detection of the voltage signal waveform generated from the secondary coil terminals is accomplished by generating a first detection signal and a second detection signal at different times, storing the voltage signal waveform across the secondary coil terminals in first and second memory circuits (D-type flip-flops) in response to the first and second detection signals, and changing the stored content of a final-stage memory circuit (an R-S flip-flop) in response to a signal representing the logical product of the output signals of the first and second memory circuits and the logical product of the inverted output signals of the first and second memory circuits, when there occurs a transition from the depressed portion to the projected portion or vice versa or a transition from the magnetic portion to the nonmagnetic portion or vice versa in the rotating body, the occurrence of such malfunction as chattering can be prevented thus ensuring accurate detection of the depressed and projected portions or the magnetic and nonmagnetic portions.

I claim:

1. A position detecting apparatus comprising:
    a transformer having a primary coil and a pair of secondary coils arranged on both sides of said primary coil, said primary coil and said secondary coils being respectively wound on a coil bobbin having a bore in which a single rod-shaped iron core is placed, said secondary coils being connected to each other in opposition to the polarity of each other, and one of said secondary coils being smaller in number of turns than the other of said secondary coils;
    an energizing source including an oscillator circuit oscillated at a predetermined frequency for energizing said primary coil;
    a rotating body made of a magnetic material and having a plurality of alternate projections and depressions of predetermined shapes along a surface thereof disposed to oppose one end of said transformer whereby rotation of said rotating body varies a magnetic coupling between said primary coil and said secondary coils so as to change the phase of a composite voltage signal produced by said secondary coils;

a comparator circuit having two comparison inputs respectively connected directly to one and the other ends of said secondary coils connected in opposite polarity to each other so as to generate a digital signal of high and low levels in response to said composite voltage signal applied from said secondary coils to said comparison inputs; and a signal generating circuit for generating a first and a second detection signal having a phase different from each other in synchronism with oscillation signals from said oscillator circuit;

a phase change detecting circuit for detecting the phase of said rectangular wave output generated from said comparator circuit whereby a rotational position signal is generated in response to a change in the phase of said rectangular wave output of said comparator circuit caused in response to the rotation of said rotating body, said phase change detecting circuit comprising a first and a second memory circuit each including a D-type flip-flop respectively responsive to said first and second detection signals to store said rectangular wave output of said comparator circuit, a first NAND circuit for producing a logical product of non-inverted output signals of said first and second memory circuits and a second AND circuit for producing a logical product of inverted output signals of said first and second memory circuits, and a final-stage memory circuit driven by said logical product signals.

2. A position detecting apparatus comprising:
a transformer having a primary coil and a pair of secondary coils arranged on both sides of said primary coil, said primary coil and said secondary coils being respectively wound on a coil bobbin having a bore in which a single rod-shaped iron core is placed, said secondary coils being connected to each other in opposition to the polarity of each other, and one of said secondary coils being greater in number of turns than the other of said secondary coils;

an energizing source including an oscillator circuit oscillated at a predetermined frequency for energizing said primary coil;

a rotating body made of nonmagnetic conductive material and having a plurality of alternate projections and depressions of predetermined shapes along a surface thereof disposed to oppose one end of said transformer whereby rotation of said rotating body varies a magnetic coupling between said primary coil and said secondary coils so as to change the phase of a composite voltage signal produced by said secondary coils;

a comparator circuit having two comparison inputs respectively connected directly to one and the other ends of said secondary coils connected in opposite polarity to each other so as to generate a digital signal of high and low levels in response to said composite voltage signal applied from said secondary coils to said comparison inputs; and a signal generating circuit for generating a first and a second detection signal having a phase different from each other in synchronism with oscillation signals from said oscillator circuit;

a phase change detecting circuit for detecting the phase of said rectangular wave output generated from said comparator circuit whereby a rotational position signal is generated in response to a change in the phase of said rectangular wave output of said comparator circuit caused in response to the rotation of said rotating body;

said phase change detecting circuit comprising a first and a second memory circuit each including a D-type flip-flop respectively responsive to said first and second detection signals to store said rectangular wave output of said comparator circuit, a first NAND circuit for producing a logical product of non-inverted output signals of said first and second memory circuits and a second AND circuit for producing a logical product of inverted output signals of said first and second memory circuits, and a final-stage memory circuit driven by said logical product signals.

3. A position detecting apparatus comprising:
a transformer having a primary coil and a pair of secondary coils arranged on both sides of said primary coil, said primary coil and said secondary coils being respectively wound on a coil bobbin having a bore in which a single rod-shaped iron core is placed, said secondary coils being connected to each other in opposition to the polarity of each other and equal in number of turns to each other;

an energizing source including an oscillator circuit oscillated at a predetermined frequency for energizing said primary coil;

a rotating body including a plurality of magnetic and nonmagnetic conductive portions arranged alternately along the surface thereof opposing one end of said transformer whereby rotation of said rotating body varies a magnetic coupling between said primary coil and said secondary coil so as to change the phase of a composite voltage signal produced by said secondary coils;

a comparator circuit having two comparison inputs respectively connected directly to one and the other ends of said secondary coils connected in opposite polarity to each other so as to generate a digital signal of high and low levels in response to said composite voltage signal applied from said secondary coils to said comparison inputs; and a single generating circuit for generating a first and a second detection signal having a phase different from each other in synchronism with oscillation signals from said oscillator circuit;

a phase change detecting circuit for detecting the phase of said rectangular wave output generated from said comparator circuit whereby a rotational position signal is generated in response to the rotation of said rotating body;

said phase change detecting circuit comprising a first and second memory circuit each including a D-type flip-flop respectively responsive to said first and second detection signals to store said rectangular wave output of said comparator circuit, a first NAND circuit for producing a logical product of non-inverted output signals of said first and second memory circuits and a second NAND circuit for producing a logical product of inverted output signals of said first and second memory circuits, and a final-stage memory circuit driven by said logical product signals.

* * * * *